United States Patent [19]

Noguchi et al.

[11] 4,122,802
[45] Oct. 31, 1978

[54] FUEL REFORMING SYSTEM

[75] Inventors: Masaaki Noguchi, Nagoya; Tsuchio Bunda, Okazaki; Taro Tanaka, Chiryu, all of Japan

[73] Assignee: Nippon Soken, Inc., Nishio, Japan

[21] Appl. No.: 725,521

[22] Filed: Sep. 22, 1976

[30] Foreign Application Priority Data

Sep. 25, 1975 [JP] Japan .............................. 50-116203

[51] Int. Cl.$^2$ ........................ F02B 43/08; F02M 1/10
[52] U.S. Cl. ............................ 123/3; 123/1 A; 261/39 A; 261/39 D; 261/44 C; 261/18 R
[58] Field of Search .................... 123/1 A, 3, 119 EC; 60/288; 261/39 A, 39 D, 44 C, 67, 18 R

[56] References Cited

U.S. PATENT DOCUMENTS

| | | | |
|---|---|---|---|
| 3,174,731 | 3/1965 | Kalert | 261/67 |
| 3,210,055 | 10/1965 | Kingsley | 261/39 B |
| 3,899,552 | 8/1975 | Bauer | 123/119 EC |
| 3,955,538 | 5/1976 | Noguchi et al. | 123/3 |
| 3,963,447 | 6/1976 | Hayashi | 60/288 |
| 3,974,813 | 8/1976 | Knapp et al. | 123/119 EC |
| 3,976,034 | 8/1976 | Shinohara et al. | 123/1 A |
| 3,986,350 | 10/1976 | Schmidt | 123/3 |
| 4,002,151 | 1/1977 | Toyoda et al. | 123/1 A |

*Primary Examiner*—Charles J. Myhre
*Assistant Examiner*—Craig R. Feinberg
*Attorney, Agent, or Firm*—Cushman, Darby & Cushman

[57] ABSTRACT

A fuel reforming system for an internal combustion engine comprises a fuel circuit connected at its downstream end to the engine and including a carburetor for producing a rich air-fuel mixture and a fuel reforming reactor vessel containing a catalyst for facilitating a catalytic reformation of the mixture into a reformed gaseous mixture rich with free hydrogen. The carburetor is provided with an air intake passage having a venturi into which a nozzle feeds the fuel from a float chamber to produce an air-fuel mixture. The nozzle has an open-bottomed end providing a fuel-metering orifice. A needle valve is movably mounted on the float chamber to control the cross-sectional area of the fuel-metering orifice in the nozzle in accordance with the temperature in the engine or the reactor vessel, whereby the air-fuel ratio of the air-fuel mixture produced by the carburetor is adjusted according to the engine or reactor vessel temperature.

11 Claims, 5 Drawing Figures

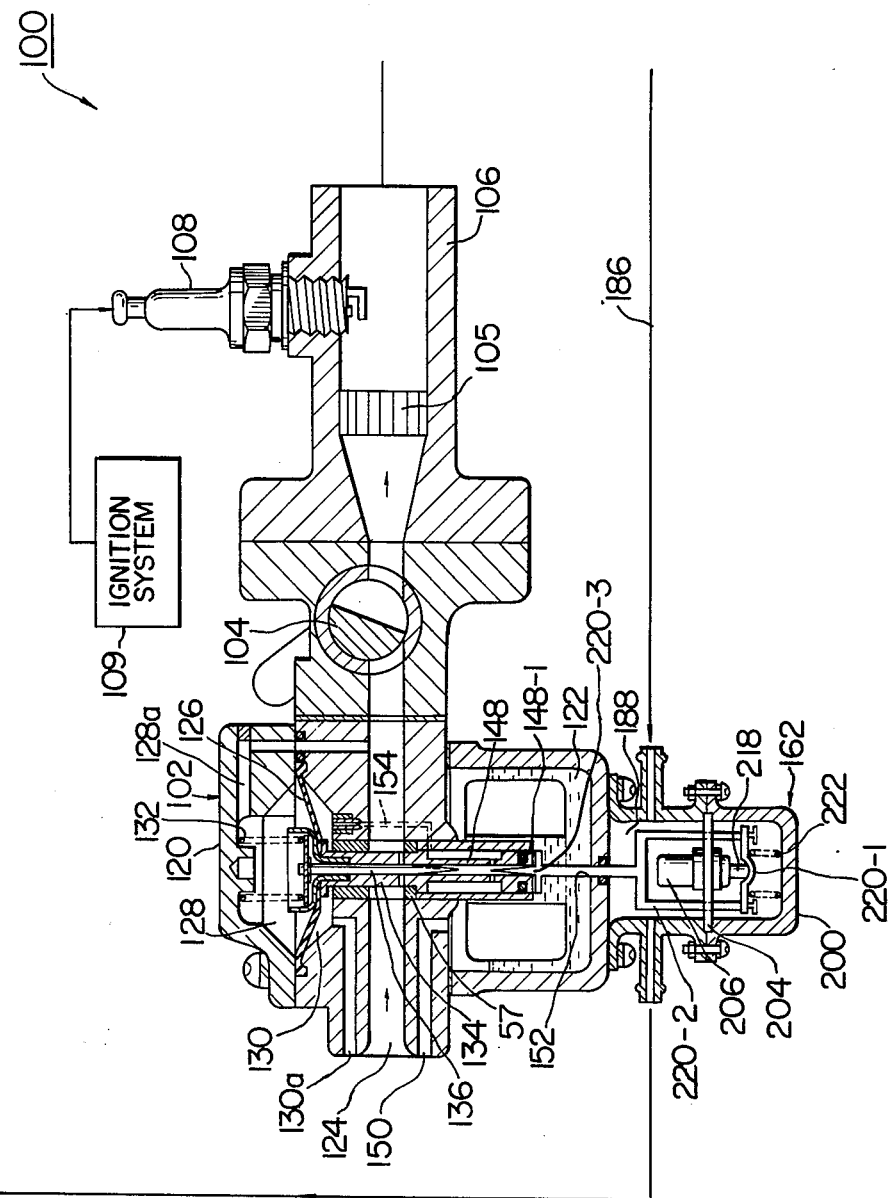

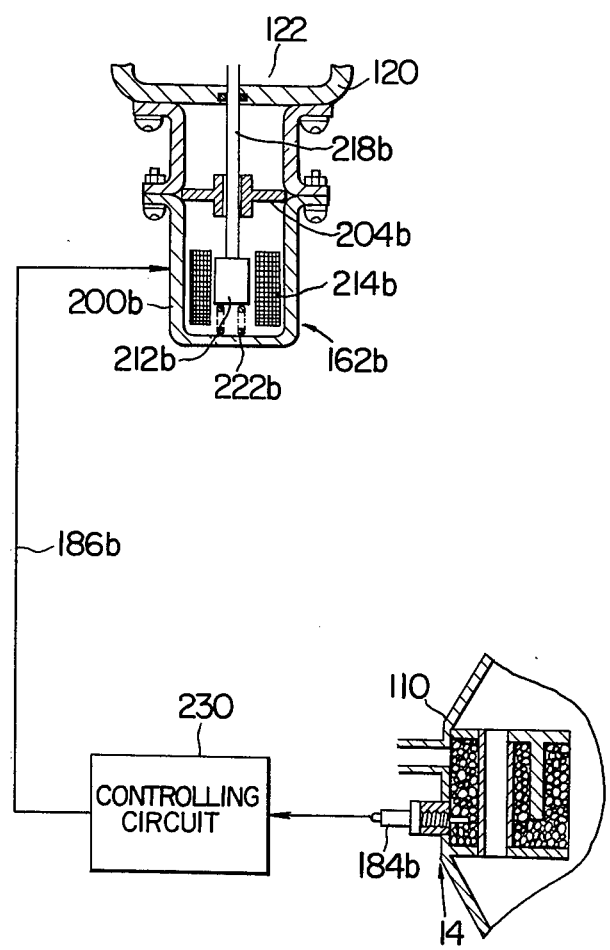

FUEL REFORMING SYSTEM

BACKGROUND OF THE INVENTION

1. Field of the Invention

The present invention relates to a system for converting a mixture of air and a fuel into a reformed gaseous mixture rich with free hydrogen and feeding the reformed gaseous mixture into an internal combustion engine.

2. Description of the Prior Art

In an attempt to reduce the emission of harmful components of engine exhaust gases or improve the fuel consumption of internal combustion engines, there has been proposed an internal combustion engine equipped with a fuel reforming system designed to convert a mixture of air and a fuel, such as hydrocarbon fuels, alcohols, aldehydes, ethers or a mixture of them, into a reformed gaseous mixture rich with free hydrogen and feed the reformed gaseous mixture into the engine, as disclosed in U.S. Pat. No. 3,908,606 issued Sept. 30, 1975 to Eiji Toyoda et al. There has also been proposed a fuel reforming system for an internal combustion engine which is operative to convert a mixture of air, a fuel, such as ones referred to above, and steam (or water) into a reformed gaseous mixture rich with free hydrogen and then introduce the reformed mixture into the engine. The prior art systems include reactor vessels each containing a catalyst for facilitating a fuel reforming catalytic reaction. When or just after the engine is cold-started, the catalyst is at a low temperature and thus incapable of sufficiently facilitate the fuel reforming rection.

The applicants' co-pending earlier application Ser. No. 641,603 filed Dec. 17, 1975 discloses a fuel reforming system for an internal combustion engine, in which a mixture of air and methanol is subjected to a catalytic reformation and converted into a reformed gaseous mixture rich with free hydrogen. The reformed mixture is then fed into the engine together with another mixture of air and a hydrocarbon fuel. The disclosure in the co-pending earlier application referred to is incorporated herein by reference.

SUMMARY OF THE INVENTION

It is an object of the present invention to provide an improved fuel reforming system for converting a mixture of air and a fuel into a reformed gaseous mixture rich with free hydrogen and feeding the thus reformed gaseous mixture into an internal combustion engine.

The fuel reforming system according to the present invention includes a fuel circuit which includes a carburetor for producing a mixture of air and a fuel, such as methanol, and a fuel reforming reactor vessel containing therein a catalyst for facilitating a catalytic fuel reforming reaction therein. The fuel circuit has its downstream end connected to an associated internal combustion engine so that a reformed gaseous mixture produced in the fuel reforming reactor vessel is introduced into the engine. An ignition means is provided in the fuel circuit betwen the carburetor and the reactor vessel and may be operated, when required, to ignite the air-fuel mixture produced by the carburetor. The carburetor is provided with an air intake passage having a venturi therein. The fuel is fed from a float chamber of the carburetor into the venturi by a fuel passage extending therebetween, so that the fuel is mixed with air passing through the venturi to form the air-fuel mixture. Advantageously, means are provided on the carburetor and operative in response to the increase in the temperature in the engine or the reactor vessel to increase the cross-sectional area of the fuel passage to vary the air-fuel ratio of the mixture produced by the carburetor. Preferred arrangement is such that, when the temperature is increased, the air-fuel ratio is decreased (i.e., the air-fuel mixture is enriched).

The fuel to be reformed may preferably be methanol, but another kind of fuel, such as a hydrocarbon fuel, may also be used with the system of the present invention.

The above and other objects, features and advantages of the present invention will be made apparent by the following description with reference to the accompanying drawings.

BRIEF DESCRIPTION OF DRAWINGS

FIG. 1B is an enlarged diagrammatic, sectional side elevational view of the rest of the embodiment shown in FIG. 1A;

FIG. 4 is a diagrammatic, fragmentary side elevational view of another embodiment of the invention.

DESCRIPTION OF PREFERRED EMBODIMENTS

Figure 1A:
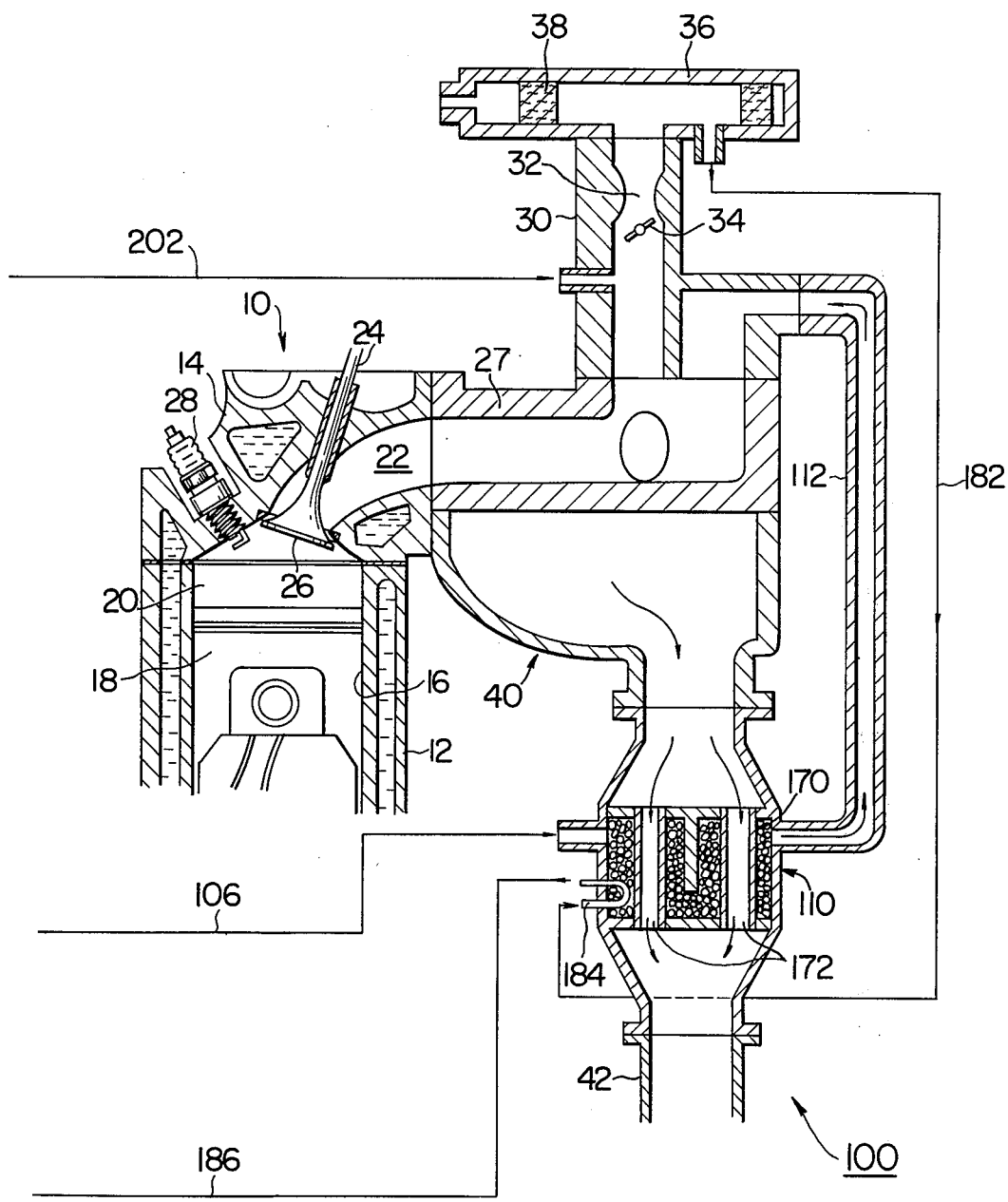
FIG. 1A is a diagrammatic, sectional side elevational view of a part of an embodiment of a fuel reforming system according to the present invention.
Figure 2:
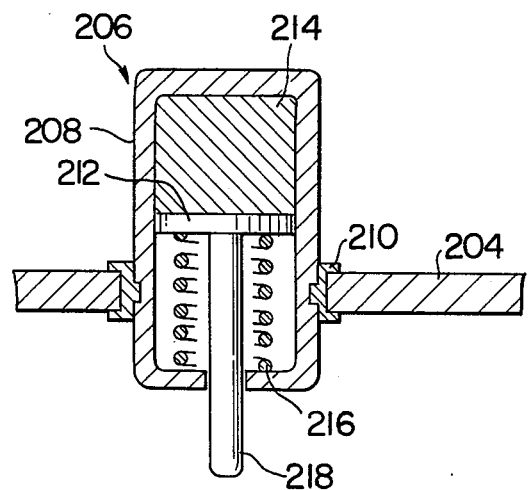
FIG. 2 is an enlarged, sectional side elevational view of a heat expansible means employed in the embodiment shown in FIGS. 1A and 1B.

Referring to FIGS. 1A, 1B, and 2, a first embodiment of a fuel reforming system according to the present invention is generally disignated by 100 and adapted to be used with an internal combustion engine which is generally indicated by 10 and shown as being a conventional four cycle reciprocated piston engine which comprises a cylinder block 12 and a cylinder head 14 mounted on the top of the cylinder block 12. The cylinder block 12 defines therein cylinders 16 only one of which is shown. A piston 18 is reciprocally received in the cylinder 16 to cooperate with the cylinder 16 and the bottom surface of the cylinder head 14 to define a combustion chamber 20. The cylinder head 14 is formed therein with an intake port 22 and an exhaust port (not shown). An intake valve 24 is reciprocally mounted on the cylinder head 14 so that a valve head 26 of the intake valve is operative to open and close the intake port 22 in conventional manner. A spark plug 28 is mounted on the cylinder head 14 so that electrodes of the spark plug are exposed to the combustion chamber 20.

The intake port 22 is connected at its upstream end with an intake pipe 27 which in turn is connected at its upstream end with a primary fuel circuit comprising a primary carburetor 30 having a venturi 32 for producing a lean mixture of air and a hydrocarbon fuel, such as gasoline. A throttle valve 34 is provided in the primary fuel circuit downstream of the venturi 32 for controlling the primary fuel supply into the respective combustion chambers 20 in known manner. An air cleaner 36 having an air filter 38 therein is mounted on the top of the primary carburetor 30. Exhaust gases from respective exhaust ports (not shown) are gathered into an exhaust gas gathering portion 40.

The fuel reforming system 100 provides a secondary fuel circuit for the engine 10 and designed to be operative to convert or reform a mixture of air and methanol into a reformed gaseous mixture rich with free hydrogen and feed the reformed gaseous mixture into the engine 10. For this purpose, the fuel reforming system 100 includes a secondary carburetor 102 for producing a mixture of air and methanol, a rotary throttle valve 104 operatively connected to the primary throttle valve 34 by a conventional link mechanism (not shown), a pipe 106 connected at its upstream end to the downstream side of the throttle valve 104, a spark plug 108 mounted on the upper side of the pipe 106, a fuel reforming, catalytic reactor vessel 110 connected to the downstream end of the pipe 106, and a second pipe 112 extending between the reactor vessel 110 and the primary fuel circuit at a point between the primary throttle valve 34 and the intake pipe 28.

The secondary carburetor 102 is of constant vacuum, horizontal draft type and comprises a carburetor housing 120 which defines therein a float chamber 122 on the under side of a primary air intake passage 124 and a space on the upper side of the air intake passage 124. A diaphragm 126 extends substantially horizontally across the space to divide the same into a first or upper pressure chamber 128 and a second or lower pressure chamber 130. A compression coil spring 132 is disposed in the first pressure chamber 128 to downwardly bias the diaphragm 126. A suction piston 134 is mounted on the under surface of the diaphragm 126 and slidably extends through the carburetor 102 and across the air intake passage 124 toward the float chamber 122. A needle 136 is also mounted on the diaphragm 126 coaxially with the suction piston 134 and reciprocally extends into a fuel-jetting orifice of a nozzle 148 extending from the air intake passage 124 into the float chamber 122 and terminating in an open-bottomed end 148-1 which defines a fuel-metering orifice disposed in the float chamber 122. The first chamber 128 is communicated by a passage 128a with the air intake passage 124 downstream of the suction piston 134, while the second chamber 130 is communicated with the atmosphere by a passage 130a. The suction piston 134 is arranged such that the differential pressure in the air intake passage 124 across the suction piston 134 is kept at a constant value which is determined by the load on the diaphragm 126 exerted by the spring 132 thereto. In other words, the suction piston 134 cooperates with the air intake passage 124 to define a variable venturi the opening of which is determined by the air flow through the passage 124. The fuel is fed from the float chamber 122 through the nozzle 148 into the venturi so that a mixture of air and the fuel is produced. The float chamber 122 is vented by an air vent 150. The interior of the nozzle 148 is communicated with the second pressure chamber 130 by an air bleeder 154.

The secondary carburetor 102 is provided with means 162 for adjusting the air-fuel ratio of the air-fuel mixture produced in the carburetor 102. Details of the air-fuel ratio adjusting means 162 will be described later.

The spark plug 108 is operated by a conventional ignition system 109 when required, i.e., for example when the reactor vessel 110 is at a low temperature, to ignite and burn at least a part of air-methanol mixture produced by the secondary carburetor 102.

A flame arrester 105 is provided in the pipe 106 between the rotary throttle valve 104 and the spark plug 108 to guard the secondary carburetor 102 against flame or flames produced by the combustion of the airmethanol mixture caused by the ignition thereof by the spark plug 108. The flame arrester 105 may be a honeycomb structure of ceramic material or made of a stack of several sheets of metal screens.

The fuel reforming, catalytic reactor vessel 110 is connected to the exhaust gas gathering portion 40 of an exhaust manifold of the engine 10 and contains a layer 170 of catalyst particles. The layer 170 extends substantially across the entire cross-sectional area of the vessel 110. The air-methanol mixture produced by the secondary carburetor 102 flows through the pipe 106 into the layer 170 of the catalyst particles. A plurality of axial passages 172 extend through the catalyst particle layer 170 so that exhaust gases from the engine 10 flow from the exhaust gas gathering portion 40 into and through the axial passages 172 in heat exchanging relationship with the catalyst particle layer 170 and the air-methanol mixture flowing therethrough. Thus, the catalyst particles are heated to a temperature sufficient for the catalytic reformation or conversion of the air-methanol mixture into a reformed gaseous mixture rich with free hydrogen, which is then supplied through the pipe 112 into the primary fuel circuit and introduced into the engine 10 together with a lean air-gasoline mixture from the primary carburetor 30. The engine exhaust gases flow from the vessel 110 into and through an exhaust pipe 42 and are then exhausted into the atmosphere.

The construction and operation of the fuel reforming, catalytic reactor vessel 110 may be similar to those disclosed in U.S. Pat. application Ser. No. 641,603 referred to above. Preferred examples of the catalyst particles which form the layer 170 are pellets of alumina coated with a metal such as nickel or copper.

The air-methanol ratio adjusting means 162 mentioned above include an air conduit 182 interconnecting the interior of the air cleaner 36 and one end of a temperature detector in the form of a U-shaped tube 184 of a metal mounted on the reactor vessel 110 with the looped end of the tube extending into the layer 170 of the catalyst particles in the vessel 110 so that the air from the air cleaner 36 flows through the temperature detector 184 in heat-exchange relationship with the catalyst particles. The air from the air cleaner 36 is heated when the air flows through the temperature detector 184. The heated air then flows through a second air conduit 186 into a temperature measuring chamber 188 defined by a housing 200, from which chamber the air is returned through a third air conduit 202 into the primary fuel circuit of the engine 10 downstream of the primary throttle valve 34. The housing 200 is mounted on the carburetor housing 120 adjacent the float chamber 122. The temperature measuring chamber 188 is defined between the housing 200 and the carburetor housing 120. A support plate 204 extends across the interior of the housing 200 and supports an expansible means 206 which comprises a cylinder member 208 rigidly mounted on the support plate 204 by means of a stay 210, a piston reciprocally received within the cylinder member 208, a mass of heat expensible material 214 filled in the space defined between the cylinder member 208 and the piston 212, and a coil spring 216 urging the piston against the heat expansible material 214, as shown in FIG. 2. The heat expansible material may be an inorganic compound such as MgO, a metal such as Pb or an alloyed metal such as solder (Pb–Sn). In the case where the second air conduit 186 is so long that the air heated during its passage through the temperature detector 184 is substantially cooled before the air reaches the temperature measuring chamber 188, the heat expansible material may preferably be paraffin or a wax.

Thus, the piston 212 will be moved downwardly when the heat expansible material 214 is expanded by the heated air supplied to the temperature measuring chamber 188. The piston 212 has a piston rod 218 which is in engagement with the upper surface of a plate 220-1 which is movably received in the housing 200 and resiliently upwardly supported by a compression coil spring 222. A pair of link members 220-2 are connected to the movable plate 220-1 and extend upwardly and slidably through the support plate 204 and connected to a second fuel-metering needle 220-3 which slidably extends through an opening 152 in the bottom of the float chamber 122. The second needle 220-3 further extends upwardly through the fuel in the float chamber 122 into the fuel-metering orifice in the open-bottomed end 148-1 of the nozzle 148. It will be appreciated that, when the heat expansible material 214 is expanded, the second needle 220-3 is moved downwardly to increase the cross-sectional area of the fuel-metering orifice in the nozzle bottom end 148-1 to thereby increase the flow of fuel through the nozzle into the venturi, thereby decreasing the air-methanol ratio of the mixture produced by the carburetor.

The operation of the described embodiment of the invention will now be described hereunder. At the time of, or just after the cold-starting of the engine 10, the catalyst particle layer 170 in the reactor vessel 110 is at a low temperature, so that the air flowing through the temperature detector 184 enters the temperature measuring chamber 188 at a low temperature. Thus, the heat expansible material 214 in the expansible means 206 is in almost non-expanded state, so that the second needle 220-3 is in a position to slightly open the fuel-metering orifice in the nozzle 148. For this reason, the ratio of the air flowing through the air intake passage 124 relative to the methanol supplied through the nozzle 148 to the venturi is larger than normal air-methanol ratio obtained during normal operation of the engine, i.e., after the engine is appropriately warmed. The larger air-methanol ratio, however, is much smaller than the stoichiometric air-methanol ratio of 6.5. The arrangement is such that the air-methanol ratio ranges from about 1.6 to about 3.0 when the reactor vessel 110 is at a low temperature. Because the air-methanol ratio is relatively large at the point of the spark plug 108, at least a part of the air-methanol mixture can be stably ignited by the spark plug 108 and burnt to produce heat of reaction, whereby a fuel reforming reaction can surely be induced in the reactor vessel 110 to reliably produce a reformed gaseous mixture rich with free hydrogen even when the reactor vessel 110 is at the low temperature.

By a continued operation of the engine, the layer 170 of the catalyst particles in the reactor vessel 110 is heated to an elevated temperature with the result that the air passing through the temperature detector 184 is also heated. The heated air is introduced into the temperature measuring chamber 188, so that the heat expansible material 214 of the heat expansible means 216 is expanded with resultant increase in the load on the compression spring 222, which causes downward displacement of the second needle 220-3 relative to the fuel-metering orifice in the nozzle 148, whereby the cross-sectional area of the fuel-metering orifice and thus the fuel flow therethrough are increased. For the reason, the air-methanol ratio of the air-methanol mixture produced by the secondary carburetor 102 is gradually decreased. The secondary carburetor 102 is arranged such that, when the layer 170 of the catalyst particles in the reactor vessel 110 is heated to a temperature high enough to induce a fuel reforming reaction (i.e., a temperature of about 350° C in the case of Ni or Cu catalyst particles), the air-methanol ratio of the air-methanol mixture produced falls within a range of from 0.3 to 1.5. In the case where a hydrocarbon fuel is used, the carburetor should also be arranged such that the air-fuel ratio of the mixture produced is much smaller than the stoichiometric air-fuel ratio. An air-methanol mixture of as small air-methanol ratio as possible is preferred in the view point of avoiding loss of chemical energy but should fall within a range of air-methanol ratio where the mixture does not produce a large amount of soot when the mixture is subjected to the catalytic reforming reaction.

As such, the air-methanol mixture is converted by the catalytic action of the catalyst particles into a reformed gaseous mixture rich with free hydrogen.

The reformed gaseous mixture flows through the pipe 112 into the intake pipe 28 of the engine 10, in which the mixture is mixed with a lean air-hydrocarbon fuel mixture from the primary carburetor 30 to form a composite mixture which is supplied into the combustion chamber 20. The existence of free hydrogen in the composite mixture assures a reliable combustion of a very lean air-fuel mixture in the combustion chamber and a reduction in the emission of harmful components of the engine exhaust gases. It will be also apparent from the above description that the air-methanol mixture is converted into the reformed gaseous mixture even at the time the engine is operating at a low temperature, whereby the engine can be smoothly operated even from the time the engine is at a low temperature.

Figure 3:
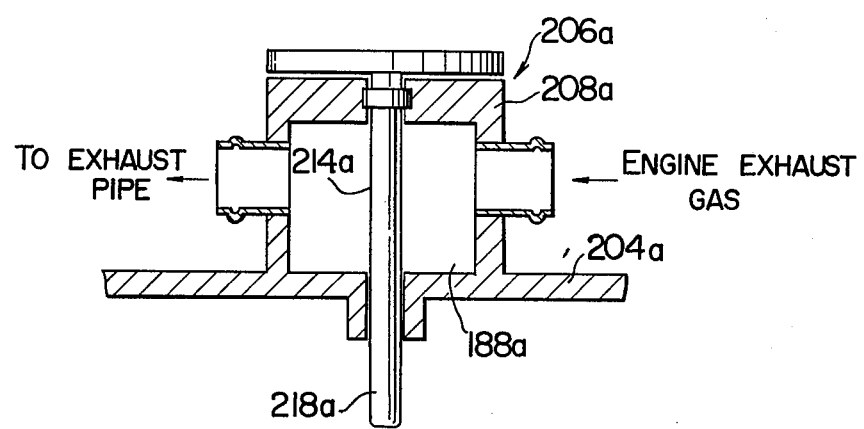
FIG. 3 is an enlarged, sectional side elevation of a modified heat expansible means.

The air-methanol ratio adjusting means 162 may also be operable by another high temperature fluid, such as engine exhaust gas, reformed gaseous mixture or engine cooling water. FIG. 3 illustrates a modified heat expansible means 206a which is particularly designed to be operable by engine exhaust gas and comprises a rod member 214a of a heat resistant metal extending through a temperature measuring chamber 188a defined in a housing 208a which is rigidly secured or connected to a support plate 204a secured to the housing 200. The rod member 124a is secured at its top end to the housing 208a and has lower end portion 218a which is freely movable through an opening in the support plate 204a. The lower end extremity of the rod member 214a may be in abutment contact with the movable plate 220-1 so that the temperature variation in the engine exhaust gas can be directly converted into displacement of the second needle 220-3 for the control of the cross-sectional area of the fuel-metering orifice in the nozzle 148, as in the embodiment described with reference to FIGS. 1A, 1B and 2.

FIG. 4 illustrates a further modification of the air-methanol ratio adjusting means generally designated by 162b, in which the temperature in the fuel reforming reactor vessel 110 is electrically detected to control the cross-sectional area of the fuel-metering orifice in the nozzle 148. Since electrical detection is employed, the conduits 182, 186, and 202 of the previously described embodiments are unnecessary. The modified air-methanol ratio adjusting means 162b includes an electric temperature detector 184b in the form of a conventional thermistor or a thermocouple which is mounted on the reactor vessel 110 to detect the temperature therein and emit an electrical signal representing the detected temperature. The electrical temperature signal is supplied to a controlling circuit 230 which is operative to compare the signal with a reference signal and decide as to whether or not the temperature in the reactor vessel 110 is high enough to achieve the catalytic reformation of the air-methanol mixture into the required reformed gaseous mixture. The controlling circuit 230 is electrically connected by a line 186b to an electromagnetic coil 214b in a housing 200b which is secured to the carburetor housing 120 adjacent to the float chamber 122. A core 212b is movably disposed within the coil 214band connected by a rod 218b to a fuel-metering needle (not shown) which movably extends into the fuel-metering orifice in the nozzle 148, as in the preceding embodiments. A compression coil spring 222b extends between the core 212b and the housing 200b. The rod 218b slidably extends through a guide plate 204b disposed in and fixed to the housing 200b. The arrangement is such that the electromagnetic coil 214b is energized by an electric current from the controlling circuit 230 during normal operation of the engine and deenergized when the temperature signal received by the controlling circuit 230 indicates that the temperature in the reactor vessel 110 is not hot enough for the intended catalytic reformation of the air-methanol mixture in the vessel. The air-methanol ratio adjusting means 162b discussed above will be operative in a manner substantially similar, but not exactly similar, to that of the preceding embodiments. In the embodiment discussed with reference to FIG. 4, the electromagnetic coil 214b is energized and deenergized according to whether the temperature in the layer 170 of the catalyst particles in the reactor vessel 110 exceeds the predetermined temperature or not. However, the controlling circuit 230 may be modified such that its output gradually and continuously varies in proportion to the variation in the temperature within the reactor vessel 110 so that the air-methanol ratio adjusting means 162b is operative in an exactly similar manner to that of the preceding embodiments.

Embodiments of the invention have been described and illustrated as being used with a conventional, spark-ignition internal combustion engine. However, it will be apparent to those skilled in the art that the fuel reforming system according to the present invention can also be used with a torch-ignition internal combustion engine having an auxiliary combustion chamber. In this instance, the reformed gaseous mixture may effectively be fed into the auxiliary combustion chamber for ignition and combustion by a spark plug, while a lean mixture of air and a hydrocarbon fuel may be supplied to a main combustion chamber of the engine for the ignition and combustion by a torch jet or jets produced by the combustion of the reformed gaseous mixture.

It will also be apparent to those in the art that the constant vacuum, horizontal draft type secondary carburetor 102 employed in the described embodiments of the present invention may be replaced by a conventional down-draft type carburetor, which provides substantially similar results. Moreover, the fuel-metering needle 220-3, which has been described and illustrated as movably extending into the fuel-metering orifice in the open-bottomed end of the nozzle 148, can be replaced by a piston-type valve member (not shown) which extends into the axial passage in the nozzle in a direction transverse to the axis of the nozzle. In this case, the housing 200 and the related components of the air-methanol ratio adjusting means 162 may be mounted on a lateral side surface of the float chamber 122 rather than on the underside thereof.

What is claimed is:

1. A fuel reforming system for converting a mixture of air and a fuel into a reformed gaseous mixture rich with free hydrogen and feeding the reformed gaseous mixture into an internal combustion engine, said system comrising:
   a fuel circuit having a downstream end adapted to be connected to an internal combustion engine;
   a carburetor disposed in said fuel circuit for producing a rich mixture of air and the fuel at an air-fuel ratio smaller than the stoichiometric air-fuel ratio of the mixture;
   said carburetor including an air intake passage, means providing a venturi in said air intake passage, a float chamber for the fuel, and means for supplying the fuel from said float chamber to said venturi substantially in proportion to the flow of air through said venturi to cooperate therewith to produce the rich air-fuel mixture;
   ignition means disposed in said fuel circuit downstream of said carburetor and being adapted to be operated, when required, to ignite and burn the air-fuel mixture in said circuit;
   a reactor vessel disposed in said fuel circuit downstream of said ignition means and containing a catalyst for facilitating a catalytic reformation of said rich air-fuel mixture into said reformed gaseous mixture, said catalyst being disposed in heat exchange relationship with the engine exhaust gases;
   said fuel supplying means comprising a fuel passage extending between said float chamber and said venturi;
   air-fuel ratio adjusting means mounted on said carburetor and being operative in response to the variation in the temperature in one of said engine and said reactor vessel to vary the cross-sectional area of said fuel passage for thereby controlling the air-fuel ratio of said rich air-fuel mixture, the arrangement being such that, when said temperature is high enough to activate said catalyst, the air-fuel ratio of the rich mixture controlled by said air-fuel ratio adjusting means is much smaller than the stoichiometric air-fuel ratio of the mixture and such that, when said temperature is not high enough to activate said catalyst, the air-fuel ratio of the rich mixture controlled by said air-fuel ratio adjusting means is still smaller than said stoichiometric air-fuel ratio but so large as to allow a part of the mixture to be ignited by said ignition means to produce heat in said fuel circuit.

2. A fuel reforming system according to claim 1, wherein said carburetor is disposed such that said air intake passage extends substantially horizontally.

3. A fuel reforming system according to claim 1, wherein said ignition means comprise a spark plug disposed on the upper side of a passage defined in said fuel circuit.

4. A fuel reforming system according to claim 1, wherein said fuel comprises methanol.

5. A fuel reforming system according to claim 1, wherein said air-fuel ratio adjusting means are operative in response to the increase in the temperature of engine exhaust gases.

6. A fuel reforming system according to claim 1, wherein said catalyst comprises at least one of nickel and copper.

7. A fuel reforming system according to claim 2, wherein said venturi providing means comprises a suction piston disposed in said air intake passage for movement in a direction transverse of the axis thereof.

8. A fuel reforming system for converting a mixture of air and a fuel into a reformed gaseous mixture rich with free hydrogen and feeding the reformed gaseous mixture into an internal combustion engine, said system comprising:

a fuel circuit having a downstream end adapted to be connected to an internal combustion engine;

a carburetor disposed in said fuel circuit for producing a mixture of air and the fuel;

said carburetor comprising a susbstantially horizontally extending air intake passage, a substantially closed space, a diaphragm extending across said space to divide the same into upper and lower chambers, a suction piston connected at one end to said diaphragm and extending into said air intake passage for movement transversely of the axis thereof to provide a variable venturi in said air intake passage, a second passage interconnecting said upper chamber and said air intake passage downstream of said venturi, a third passage communicating said lower chamber and the atmosphere, a spring member disposed in said upper chamber for downwardly urging said diaphragm, a float chamber for said fuel, a nozzle extending from said float chamber to said venturi to cooperate therewith to produce said air-fuel mixture, a fuel-metering orifice at the bottom end of said nozzle, a first needle movable with said suction piston to control the cross-sectional area of the opening of said nozzle in said venturi, a temperature measuring chamber adjacent said float chamber, means disposed in said temperature measuring chamber and being expansible and contractible in response to the variation in the temperature in said temperature measuring chamber, and a second needle operatively associated with said expansible and contractible means to control the cross-sectional area of said fuel-metering orifice, the arrangement being such that said second needle increases the cross-sectional area of said fuel-metering orifice as the temperature is said temperature measuring chamber increases thereby to decrease the air-fuel ratio of the air-fuel mixture produced by said carburetor;

a throttle valve disposed in said fuel circuit downstream of said carburetor;

a spark plug disposed in said fuel circuit downstream of said throttle valve and being adapted to be operated, when required, to ignite and burn the rich air-fuel mixture;

a reactor vessel disposed in said fuel circuit downstream of said spark plug and containing a catalyst for facilitating a catalytic reformation of the air-fuel mixture into the reformed gaseous mixture; and means for causing atmospheric air to flow through said reactor vessel in heat exchange relationship with said catalyst and then through said temperature measuring chamber.

9. A fuel reforming system according to claim 1, wherein said air-fuel ratio adjusting means comprises a valve and means for actuating said valve in response to temperature variation, said valve actuating means including:

a temperature detector mounted on said reactor vessel to detect the temperature in said reactor vessel for thereby emitting an electrical output signal representing the detected temperature; and means responsive to the electrical output signal to control said valve, the valve being actuated to increase the cross-sectional area of said fuel passage to decrease the air-fuel ratio of the mixture produced in said venturi as the temperature in said reactor vessel rises.

10. A fuel reforming system according to claim 9, further comprising:

a throttle valve disposed in said fuel circuit downstream of said venturi, said throttle valve being operable to control the cross-sectional area of a passage defined in said fuel circuit.

11. A fuel reforming system according to claim 10, wherein said ignition means comprises a spark plug mounted on said fuel circuit downstream of said throttle valve for producing a spark ignition of said air-fuel mixture in said fuel circuit.

* * * * *